United States Patent
Geng et al.

(10) Patent No.: US 12,014,638 B2
(45) Date of Patent: Jun. 18, 2024

(54) SUPPORTING FLIGHT OPERATIONS OF AN AIRCRAFT IN AN AIRSPACE SYSTEM

(71) Applicant: AURORA FLIGHT SCIENCES CORPORATION, Manassas, VA (US)

(72) Inventors: Andrew Geng, Somerville, MA (US); Margaret Reagan, Cambridge, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 289 days.

(21) Appl. No.: 17/686,052

(22) Filed: Mar. 3, 2022

(65) Prior Publication Data

US 2022/0301445 A1    Sep. 22, 2022

Related U.S. Application Data

(60) Provisional application No. 63/164,247, filed on Mar. 22, 2021.

(51) Int. Cl.
 G08G 5/00  (2006.01)
 G05D 1/00  (2006.01)
 B64D 43/00  (2006.01)

(52) U.S. Cl.
 CPC ........... G08G 5/0034 (2013.01); G05D 1/106 (2019.05); B64D 43/00 (2013.01)

(58) Field of Classification Search
 CPC .. G08G 5/0034; G08G 5/0013; G08G 5/0026; G08G 5/0043; G08G 5/0052; G05D 1/106; G05D 1/101; B64D 43/00; G01C 21/3453
 See application file for complete search history.

(56) References Cited

U.S. PATENT DOCUMENTS

| 9,224,302 B1 * | 12/2015 | Young ................ G08G 5/0091 |
| 2015/0268048 A1 | 9/2015 | Seastrand et al. |
| 2016/0093218 A1 | 3/2016 | Hale et al. |

(Continued)

OTHER PUBLICATIONS

Navigation System Data Base, ARINC Specification 424-17. Airlines Electronic Engineering Committee, Aeronautical Radio, Inc., Annapolis, MD, Aug. 31, 2004. 409 pages.

(Continued)

*Primary Examiner* — Michael V Kerrigan
(74) *Attorney, Agent, or Firm* — Quinn IP Law

(57) ABSTRACT

A method is provided for supporting flight operations of an aircraft in an airspace system. The method includes accessing a flight plan that indicates clearances that describe a planned route the aircraft is authorized to travel through the airspace system. The clearances are applied to an airborne navigation database to map the clearances to a sequence of procedural legs of procedures to be followed by the aircraft, the sequence of procedural legs including a sequence of position fixes and indicating leg types of the procedural legs. A ground track and vertical guidance for the aircraft are determined from the sequence of procedural legs, subject to rules and constraints of the clearances and the procedures. And a three-dimensional trajectory for the aircraft that follows the planned route, from the ground track and the vertical guidance is generated and output for use in guidance, navigation or control of the aircraft.

21 Claims, 11 Drawing Sheets

(56) References Cited

U.S. PATENT DOCUMENTS

2020/0118446 A1 4/2020 Saunders
2020/0118450 A1 4/2020 Christophe et al.

OTHER PUBLICATIONS

Extended European Search Report in the corresponding European Patent Application No. 22161109.8, dated Sep. 16, 2022. 10 pages.
Schoemig, E. et al. 3D Path Concept and Flight Management System (FMS) Trades. 2006 IEEE, 25th Digital Avionics Systems Conference, Boeing Commercial Airplanes, Seattle, WA, USA, Oct. 15, 2006. 12 pages.

* cited by examiner

SUPPORTING FLIGHT OPERATIONS OF AN AIRCRAFT IN AN AIRSPACE SYSTEM

CROSS-REFERENCE TO RELATED APPLICATION(S)

The present application claims priority to U.S. Provisional Patent Application No. 63/164,247, entitled Supporting Flight Operations of an Aircraft in an Airspace System, filed on Mar. 22, 2021, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple examples of robot operation. These examples of robot operation include automatic control of a given robot to support remote human control. Another example is optimization systems (and associated methods) to determine how, for a given robot or set of robots, tasks should be ordered and/or allocated. And yet another example of robot operation is automatic, real-time or near real-time data processing, and exploitation in support of automatic route planning, mission execution and other activities.

Despite advancements, existing autonomy systems are typically configured to address only one example of these activities, thereby focusing its design of the underling autonomy algorithms and software architecture on a narrow mission set. This limits the extensibility of existing autonomy systems, as they are not well-equipped to support the addition of new modules to the autonomy system. Furthermore, existing autonomy systems may or may not be structured for rapid adaptation to new platforms through parameterization.

Therefore it would be desirable to have a system and method that takes into account at least some of the issues discussed above, as well as other possible issues.

BRIEF SUMMARY

Example implementations of the present disclosure support flight operations of a robot and in particular an aircraft in an airspace system served by an air navigation service provider (ANSP). Example implementations generate a trajectory for an aircraft that follows a planned route authorized by the ANSP, and that rules and constraints to which the aircraft is subject when in the airspace system. Example implementations may accept flight plans and similar instructions encoded as text or that may be converted from speech to text, and in a human-readable format understandable by pilots, air traffic controllers and others that participate in the airspace system.

The present disclosure thus includes, without limitation, the following example implementations.

Some example implementations provide a method of supporting flight operations of an aircraft in an airspace system, the method comprising: accessing a flight plan that describes a proposed flight of the aircraft, the flight plan indicating clearances that describe a planned route the aircraft is authorized by an ANSP to travel through the airspace system; applying the clearances to an airborne navigation database to map the clearances to a sequence of procedural legs of procedures defined by the ANSP, the sequence of procedural legs including a sequence of position fixes, and indicating leg types each leg type of which is described by a type of flight path and a type of termination of the type of flight path; determining a ground track and vertical guidance for the aircraft from the sequence of procedural legs including the sequence of position fixes and the leg types, subject to rules and constraints of the clearances and the procedures; generating a three-dimensional (3D) trajectory for the aircraft that follows the planned route, from the ground track and the vertical guidance; and outputting the 3D trajectory for use in at least one of guidance, navigation or control of the aircraft.

In some example implementations of the method of any preceding example implementation, or any combination of any preceding example implementations, determining the ground track comprises: generating a sequence of simple procedural legs in which a procedural leg with a leg type including one or more turns is expanded into a sequence of procedural sub-legs with leg types excluding turns; and determining the ground track from the sequence of simple procedural legs.

In some example implementations of the method of any preceding example implementation, or any combination of any preceding example implementations, generating the sequence of simple procedural legs comprises: accessing state data that describes a start position, speed and heading of the aircraft at a position fix of the procedural leg with the leg type including the one or more turns; and expanding the procedural leg into the sequence of procedural sub-legs including a respective sequence of position fixes determined from the start position, speed and heading.

In some example implementations of the method of any preceding example implementation, or any combination of any preceding example implementations, determining the ground track comprises: identifying start positions of the aircraft at position fixes in the sequence of simple procedural legs, and one or more target altitudes, speeds and vertical speeds of the aircraft; and applying the start positions, and the one or more target altitudes, speeds and vertical speeds, to a kinematic model of the aircraft to determine the ground track.

In some example implementations of the method of any preceding example implementation, or any combination of any preceding example implementations, the ground track as determined is expressed as a path composed of the start positions interconnected by one or more of geodesics or arcs on a reference ellipsoid.

In some example implementations of the method of any preceding example implementation, or any combination of any preceding example implementations, determining the vertical guidance comprises: determining one or more notional altitudes, speeds and vertical speeds of the aircraft over the ground track; applying the one or more notional altitudes, speeds and vertical speeds to a kinematic model of the aircraft to determine one or more target altitudes, speeds and vertical speeds from which the vertical guidance is determined.

In some example implementations of the method of any preceding example implementation, or any combination of any preceding example implementations, determining the vertical guidance further comprises: identifying start positions, speed and heading of the aircraft at position fixes in the sequence of procedural legs; and applying the start positions, speed and heading, and the one or more target altitudes, speeds and vertical speeds, to the kinematic model to determine the vertical guidance as reachable altitude and speed along the ground track.

Some example implementations provide an apparatus for supporting flight operations of an aircraft in an airspace system served by an ANSP, the apparatus comprising a memory having computer-readable program code stored therein; and processing circuitry configured to access the memory, and execute the computer-readable program code to cause the apparatus to at least perform the method of any preceding example implementation, or any combination of any preceding example implementations.

Some example implementations provide a computer-readable storage medium for supporting flight operations of an aircraft in an airspace system served by an ANSP, the computer-readable storage medium being non-transitory and having computer-readable program code stored therein that, in response to execution by processing circuitry, causes an apparatus to at least perform the method of any preceding example implementation, or any combination of any preceding example implementations.

These and other features, examples, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its examples and example implementations, should be viewed as combinable unless the context of the disclosure clearly dictates otherwise.

It will therefore be appreciated that this Brief Summary is provided merely for purposes of summarizing some example implementations so as to provide a basic understanding of some examples of the disclosure. Accordingly, it will be appreciated that the above described example implementations are merely examples and should not be construed to narrow the scope or spirit of the disclosure in any way. Other example implementations, examples and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
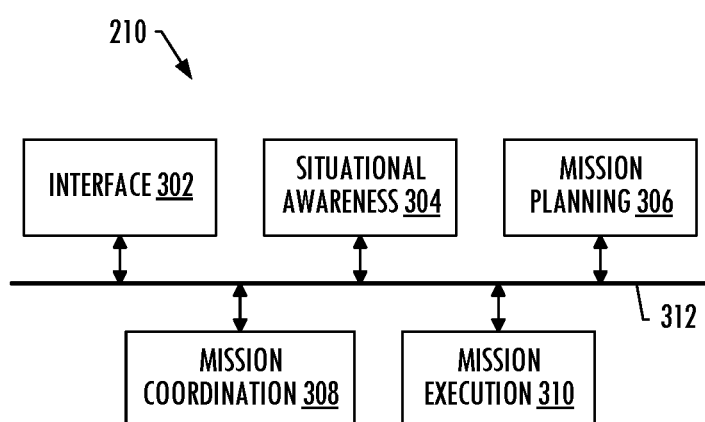
Figure 4:
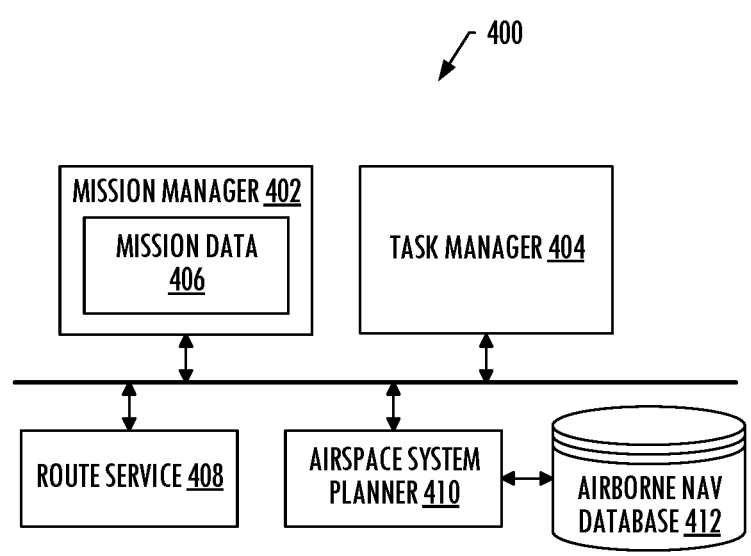
Figure 5:
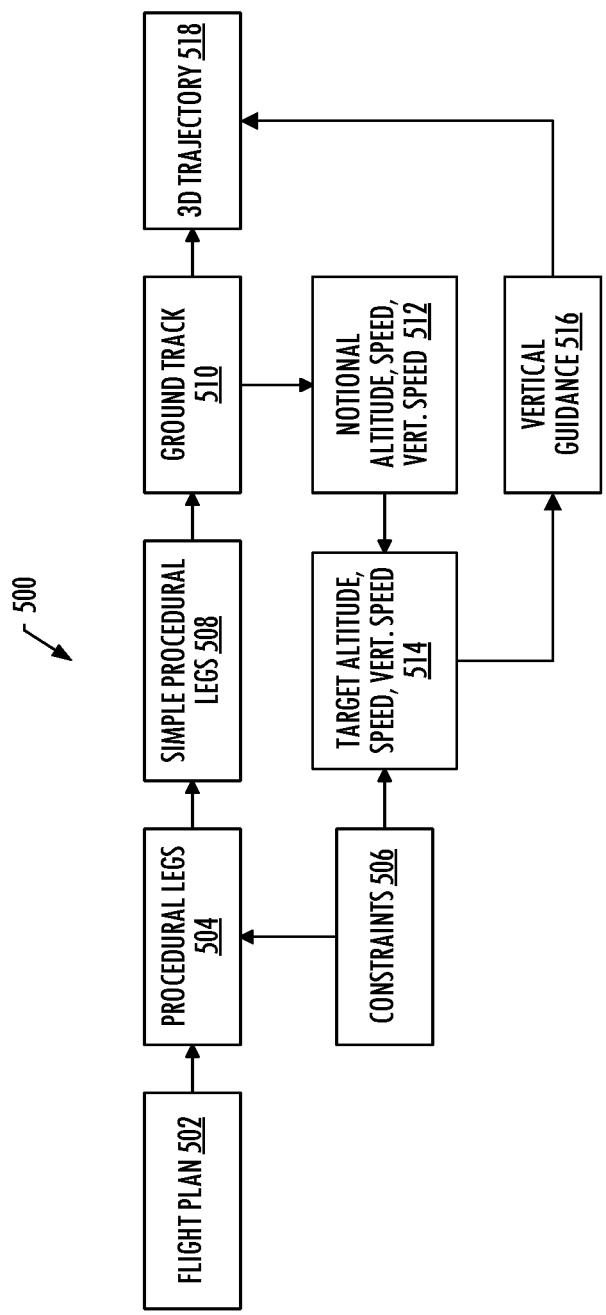
Figure 6A:
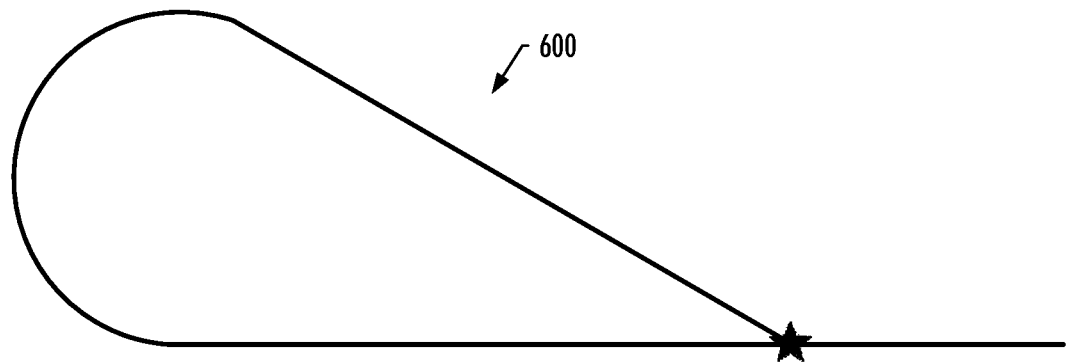
Figure 6B:
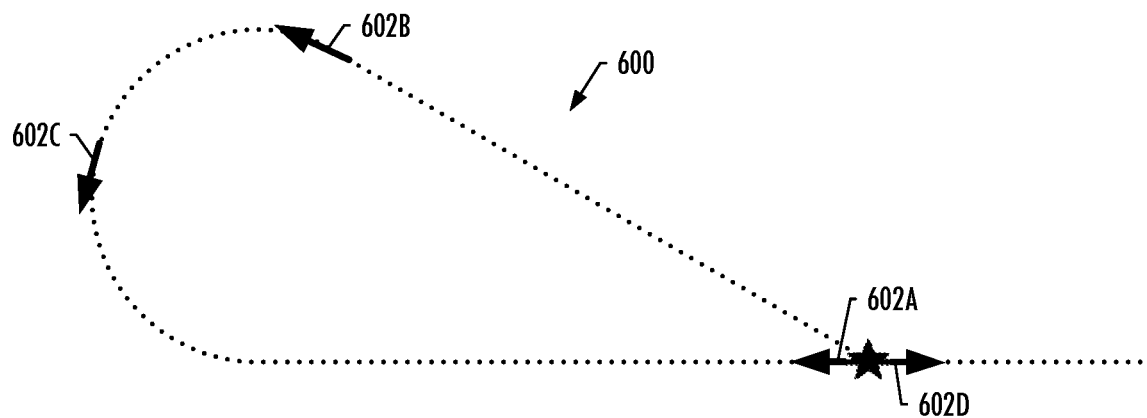
Figure 6C:
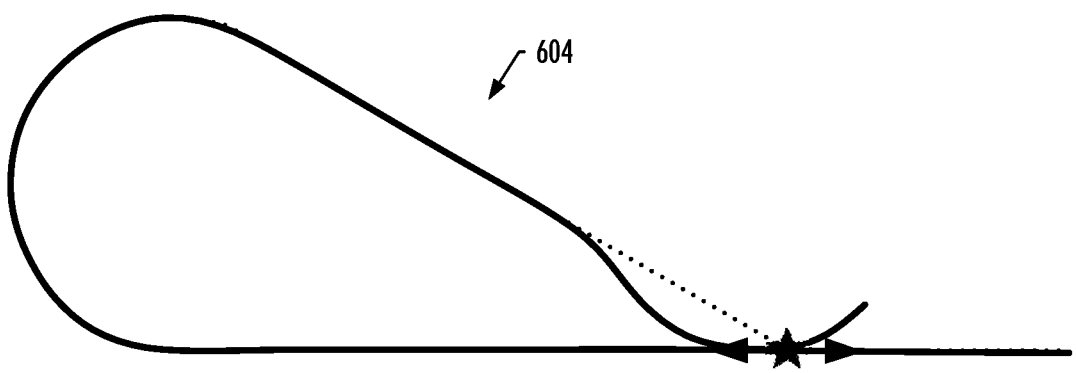
Figure 7:
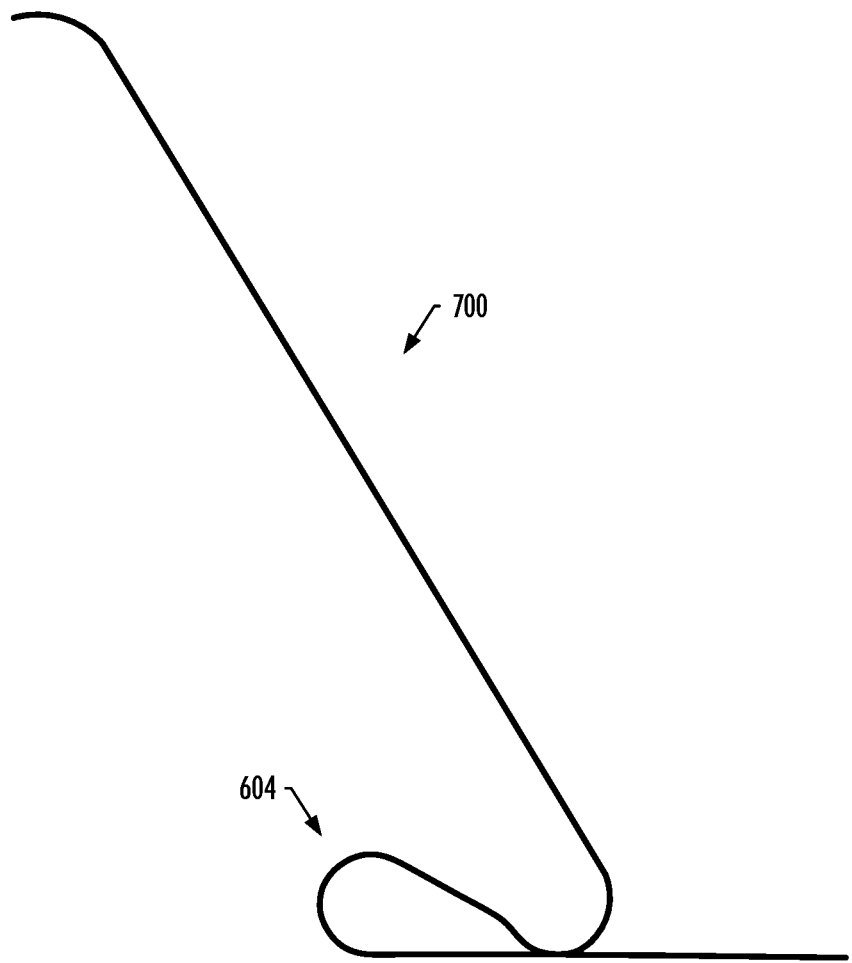
Figure 8:
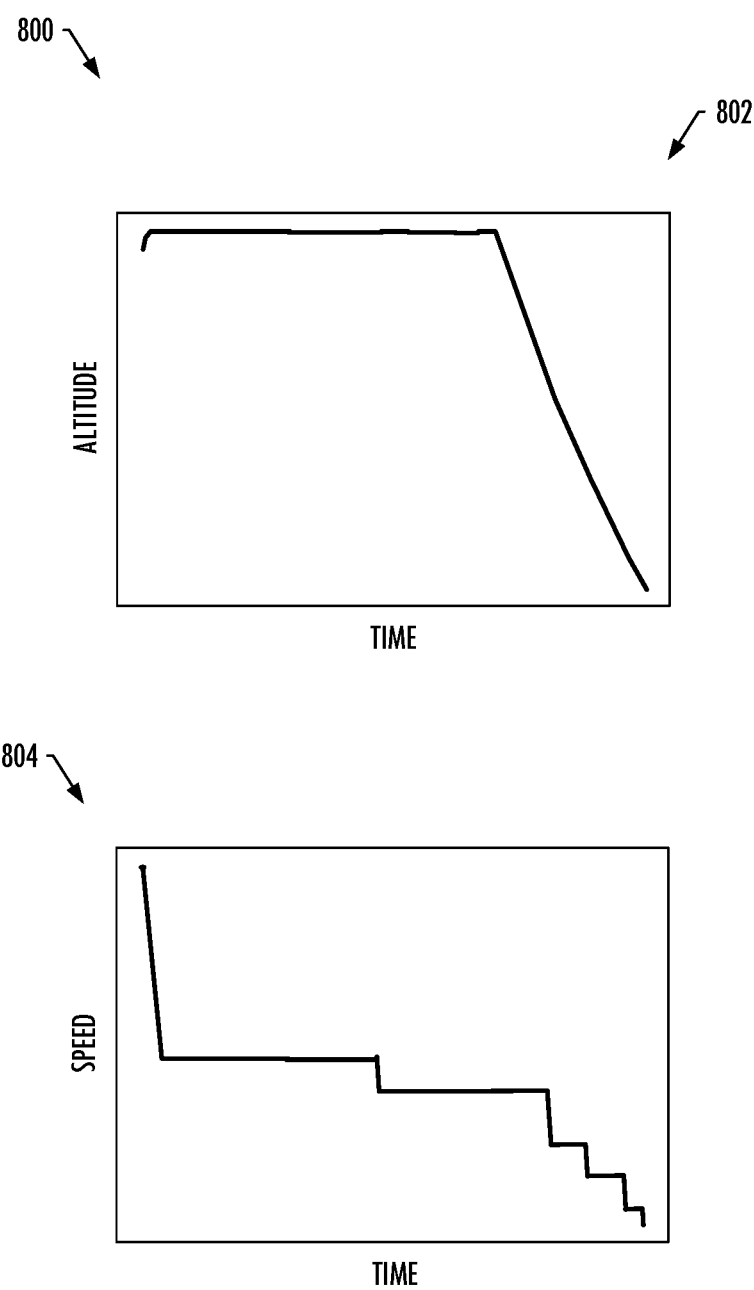
Figure 9A:
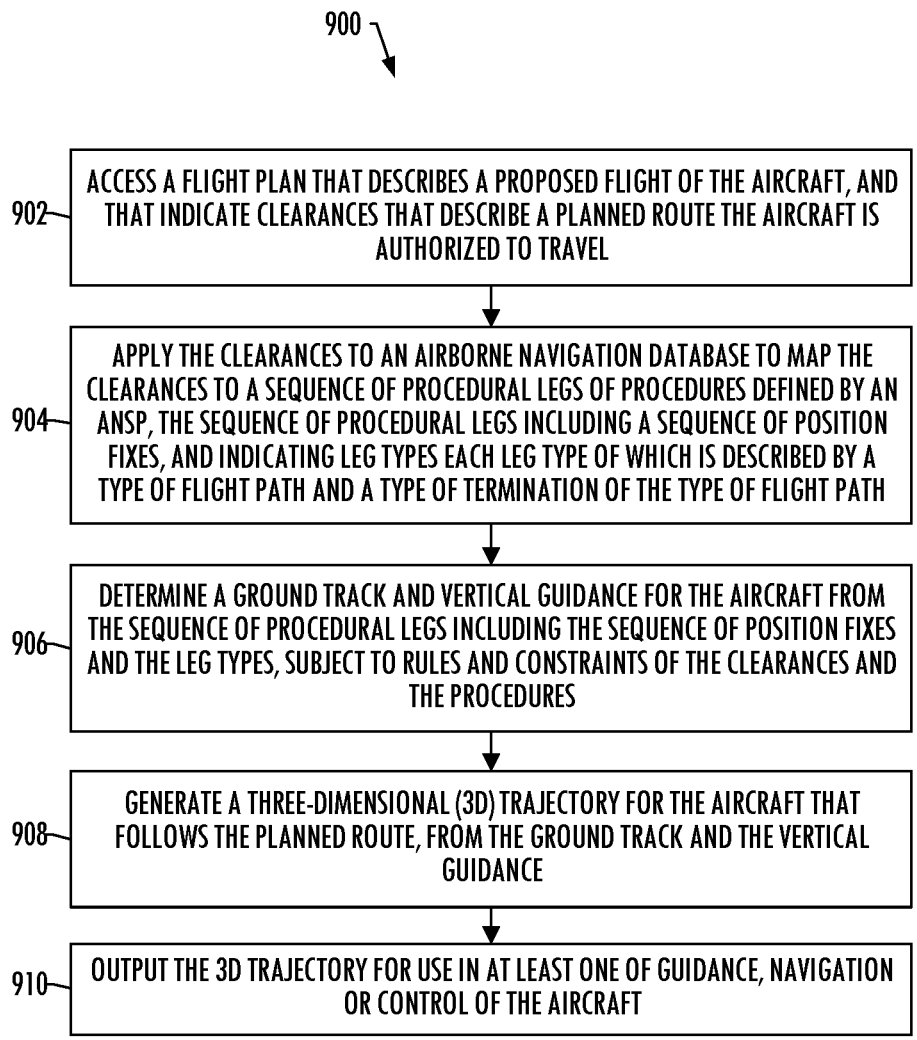
Figure 9B:
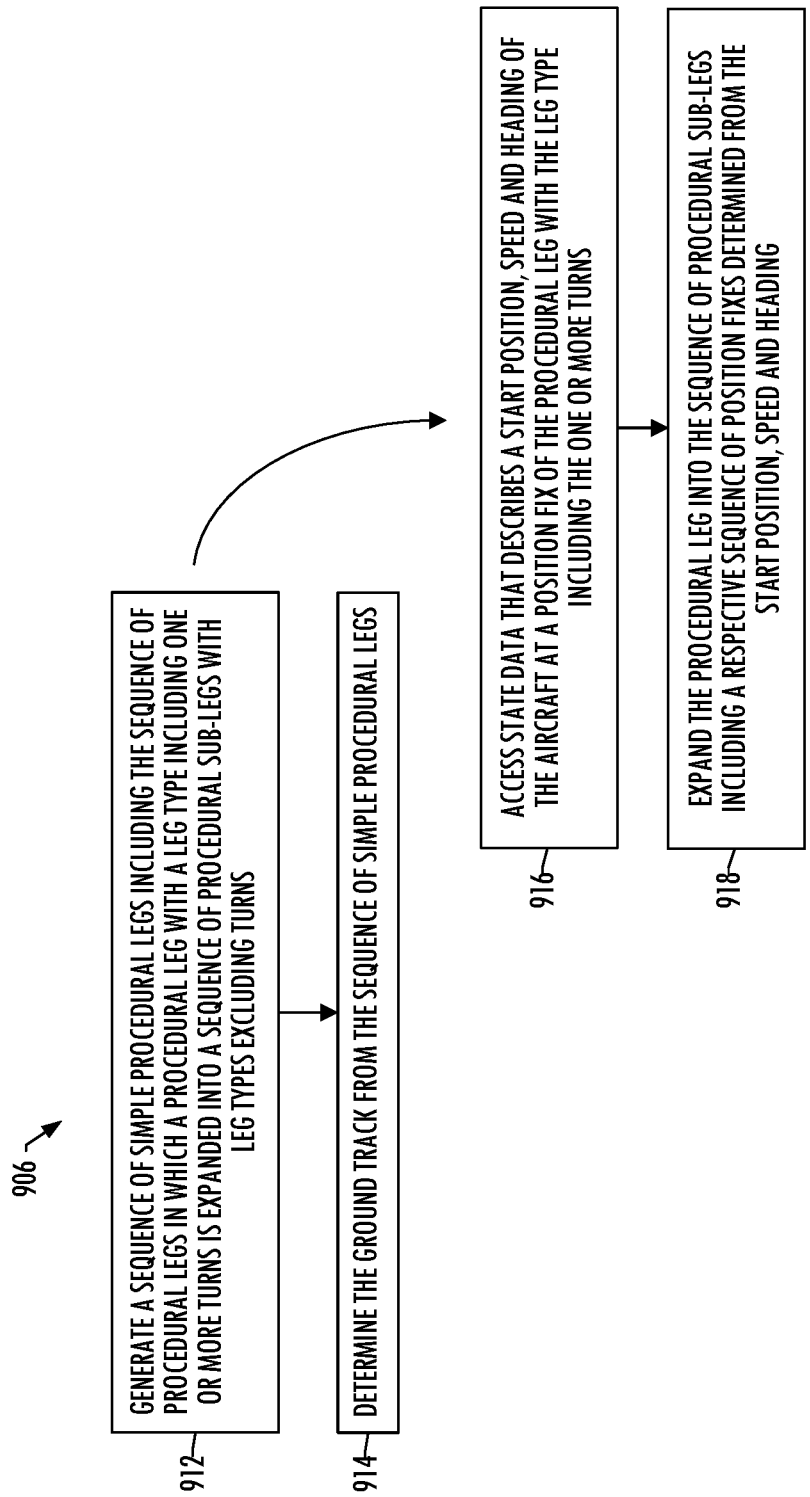
Figure 9C:
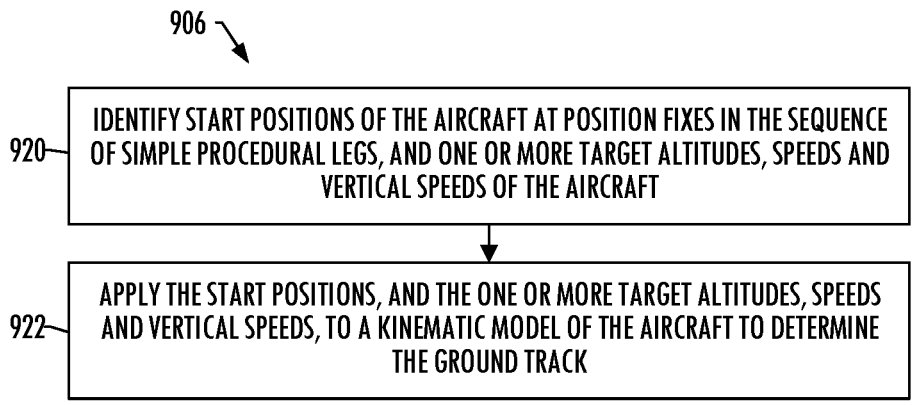
Figure 9D:
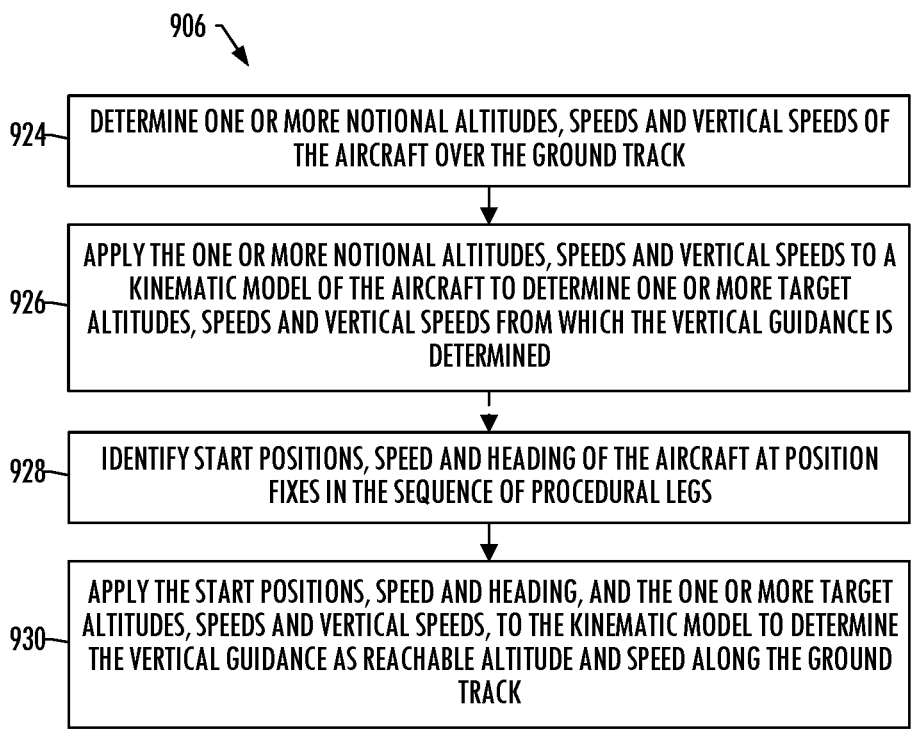
Figure 10:
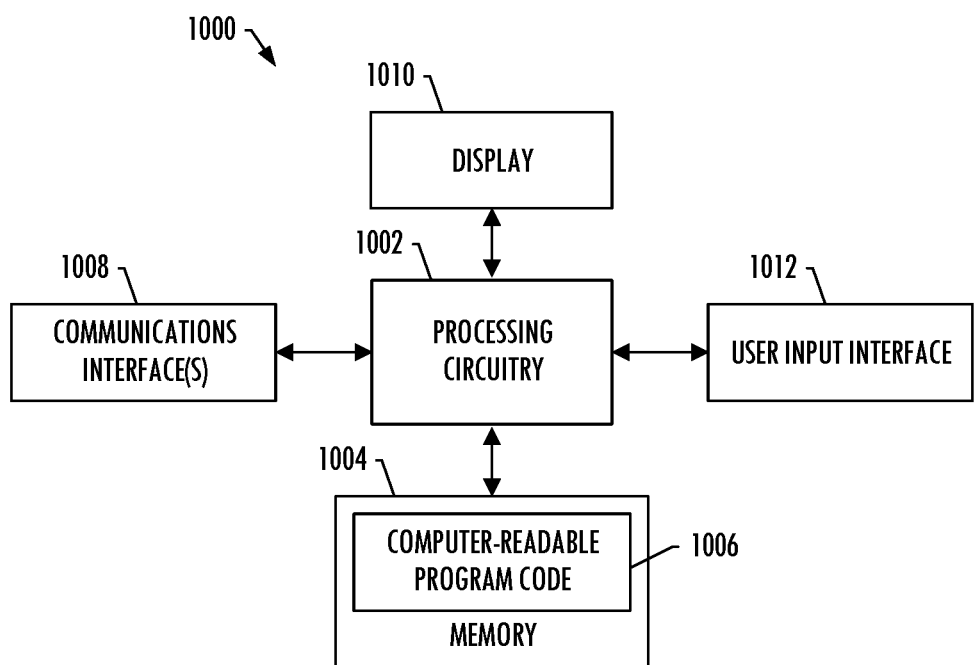

FIG. 3 more illustrates a mission management system (MMS) according to some example implementations;

FIG. 4 is a diagram of services that may be implemented by one or more subsystems of the MMS, according to some example implementations;

FIG. 5 is an operational block diagram including operations that may be performed by an airspace system planner service to generate a three-dimensional (3D) trajectory, according to some example implementations;

FIGS. 6A, 6B and 6C illustrate respectively a procedural leg, expansion of the procedural leg into sub-legs, and a ground track for the procedural leg, according to some example implementations;

FIG. 7 illustrates a ground track for a sequence of procedural legs a flight plan that includes the ground track shown in FIG. 6C;

FIG. 8 illustrates vertical guidance as reachable altitude and speed along the ground track of FIG. 7, according to some example implementations;

FIGS. 9A, 9B, 9C and 9D are flowcharts illustrating various steps in a method of supporting flight operations of an aircraft in an airspace system served by an ANSP, according to example implementations; and FIG. 10 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data,"

"content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot, an aerial vehicle, an aircraft or the like. A robot designed and configurable to operate with at least some level of autonomy may at times be referred to as an autonomous robot, or an autonomous aerial robot, autonomous aerial vehicle or autonomous aircraft in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
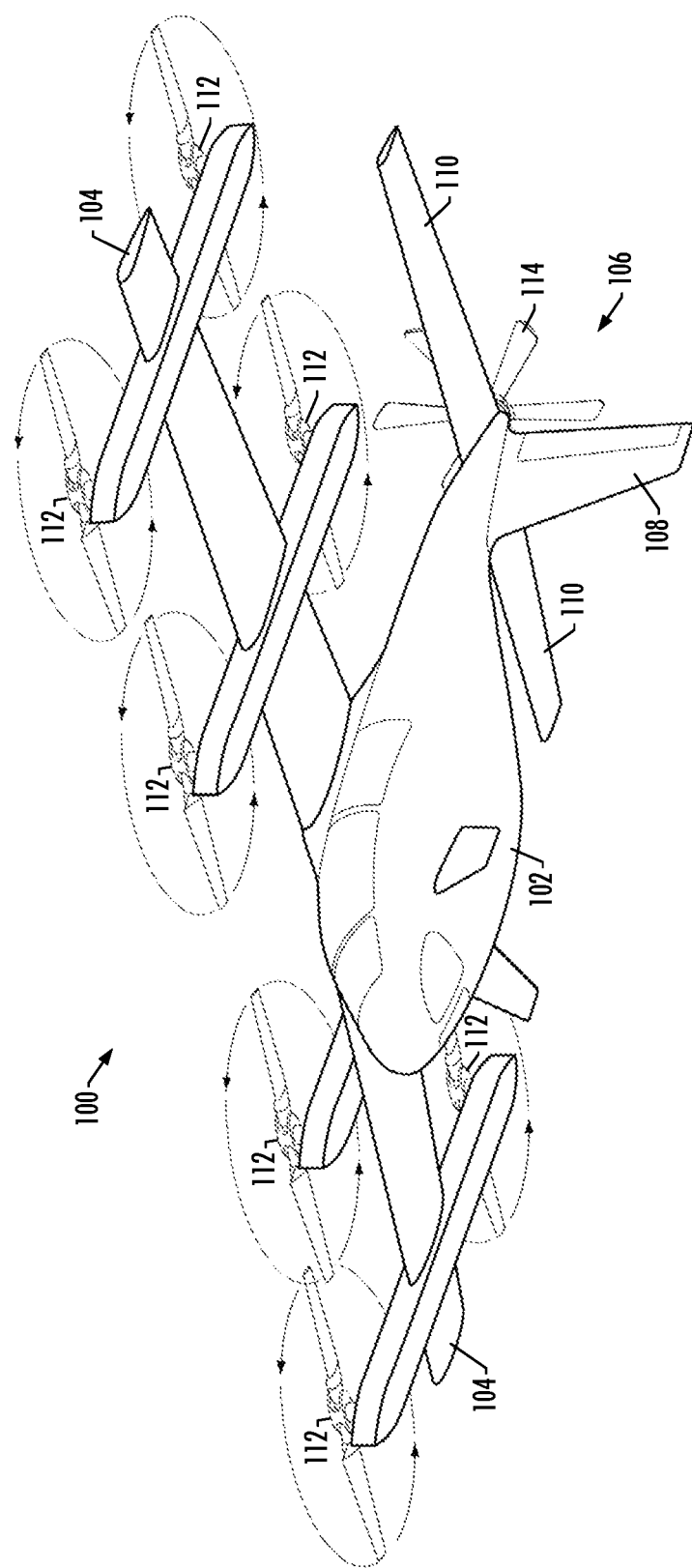
FIG. 1 illustrates one type of robot, namely, an unmanned aerial vehicle, that may benefit from example implementations of the present disclosure.

FIG. 1 illustrates one type of robot or more particularly aircraft, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
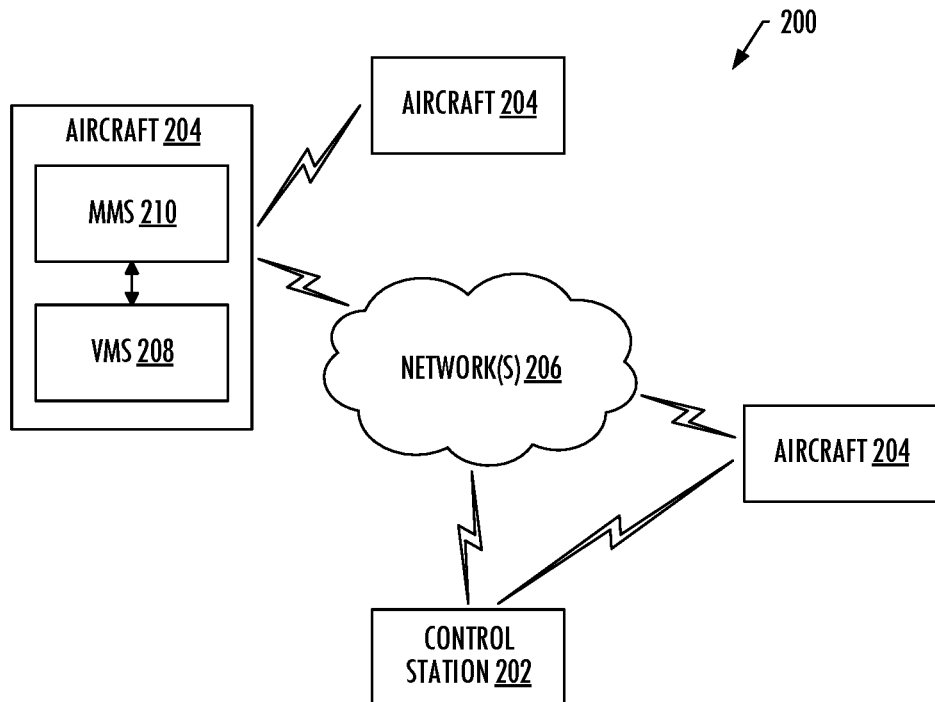
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots such as one or more aircraft 204 (e.g., one or more UAVs 100). The control station provides facilities for communication with or control of the one or more aircraft, such as by wired or wireless data links directly or across one or more networks 206. In some examples, the control station may be a ground station, and not in all cases control the aircraft. In this regard, the control station may be configured to monitor the aircraft. The control station may initiate mission, but the control station may not control the aircraft to maneuver. At times, then, the control station may enable or provide a distributed network/server of software functions.

The aircraft 204 includes a robot management system (RMS) implemented as a vehicle management system (VMS) 208 and a mission management system (MMS) 210. The RMS is a robot-specific subsystem configured to manage subsystems and other components of the robot, and the VMS is a particular RMS implementation for a vehicle such as an aircraft. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS/VMS is configured to accept maneuver commands such as waypoints and/or steering commands, and control the robot/aircraft to follow those maneuver commands.

The MMS 210 is a subsystem configured to manage missions of the aircraft 204. A mission is a deployment of the aircraft (one or more aircraft) to achieve one or more mission objectives. A mission may be decomposed into maneuvers of the aircraft with optional sensor and/or effector scheduling, and the MMS may execute tasks to manage the aircraft to execute maneuvers with specific parameters and capabilities. The MMS 210 includes subsystems to process sensor data to situational awareness, plan tasks for the aircraft (or multiple aircraft), coordinate with teams to assign tasks, execute assigned tasks. The MMS is also configured to interface with the RMS 208, and in some examples the control station 202. Although the MMS is shown on the aircraft, the MMS may instead be at the control station; or in some examples, the MMS may be distributed between the aircraft and the control station.

In some examples, the MMS 210 provides a complete, end-to-end autonomy architecture with open system architecture standards and parameterized to allow rapid extension and reapplication to a variety of robots including aircraft 204. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the aircraft 204, at the control station 202, or distributed between the aircraft and the control station. The subsystems may be configured to communicate with one another directly, over a communication bus 312, or across the network(s) 206 in examples in which the MMS is distributed between the aircraft and the control station.

The subsystems enable the MMS 210 of the aircraft 204 to interface with the system 200, perform situational awareness, plan a mission including a plurality of tasks, coordinate the plurality of tasks and thereby the mission with other aircraft 204, and execute the mission. For example, the MMS may use the interface subsystem 302 to interface with various sensors onboard the aircraft, the RMS 208, the control station 202 and/or other aircraft. The MMS may use the situational awareness subsystem 304 to acquire sensor data and maintain an awareness of the state of the environment in which the aircraft is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other aircraft and users, where agreed-upon tasks may then be executed by the MMS using the mission execution subsystem 310.

According to some example implementations of the present disclosure, various ones of the subsystems of the MMS 210 are configured to implement various software functionality or functionalities (at times referred to as services) to perform their respective functions. FIG. 4 is a diagram of services 400 that may be implemented by one or more subsystems of the MMS. As shown, the services may include a mission manager 402 service and a task manager 404 service that may be implemented by the mission execution subsystem 310. The mission manager service is generally configured to identify a mission including a nominal sequence of selected tasks that are executable to cause the aircraft 204 to execute maneuvers to achieve a mission objective. In some examples, the mission is identified from mission data 406. And in some of these examples, the task manager service is configured to access mission data for the mission, and execute the selected tasks according to the mission data.

As also shown, the services 400 include a route 408 service and an airspace system (AS) planner 410 service. The route service is generally configured to generate a flight plan for the mission, which in some examples is encoded as text. The flight plan describes a proposed flight of the aircraft 204 that indicates clearances such as instrument flight rules (IFR) clearances that describe a planned route the aircraft 204 is authorized by an air navigation service provider (ANSP) to travel through the airspace system. These clearances may be defined by the ANSP and include rules and regulations that govern flight, such as by reference to instruments in the case of IFR, or by reference to outside visual cues in the case of visual flight rules (VFR).

The airspace system is served by the ANSP, and includes an airspace, infrastructure and rules, regulations and the like for navigating the airspace. The ANSP is generally a public or private entity that provides air navigation services, and manages air traffic for an organization, region or country. One example of an ANSP in the United States is the Federal Aviation Administration (FAA). Examples of suitable airspace systems include the National Airspace System (NAS) and the new NextGen system that are served by the FAA.

One example of a suitable flight plan may include the following: "TANER TANER.CURLY3 ABQ.R08-Y RWO8 KABQ." The example flight plan specifies an enroute waypoint (TANER), transition to an arrival procedure (CURLY3), transition to a named branch (ABQ) of an approach procedure (R (short for RNAV), Y) on a runway (08). The flight plan further indicates the runway (RW08) and destination airport (KABQ).

The AS planner 410 service is generally configured to generate a three-dimensional (3D) trajectory for the aircraft 204 that follows the planned route indicated by the flight plan. FIG. 5 is an operational block diagram 500 including operations that may be performed by the AS planner service to generate the 3D trajectory according to some example implementations.

According to some example implementations, the AS planner 410 service is configured to access the flight plan that indicates clearances such as IFR clearances, and apply the clearances to an airborne navigation database 412 to map the clearances to a sequence of procedural legs of procedures such as IFR procedures defined by the ANSP to be followed by the aircraft during the proposed flight, as shown at blocks 502 and 504. The airborne navigation database 412 may be formatted in a number of different manners, such as according to the ARINC 424 *Navigation System Data Base Standard*, published by Aeronautical Radio, Inc.

Each of the procedures includes one or more predetermined maneuvers with applicable rules and constraints. These rules and constraints may include those that are designed for safe flight operations of the aircraft 204 such as those related to separation, clearance, altitude (e.g., minimum off-route altitude, minimum safe altitude), speed, vertical speed and the like. Examples of suitable procedures include terminal area procedures, departure procedures (e.g., standard instrument departures—SIDs), arrival procedures (e.g., standard terminal arrival routes (STARs), approach procedures and the like. An approach procedure may be in turn linked to a missed approach procedure.

The sequence of procedural legs includes a sequence of position fixes, and indicates leg types each leg type of which is described by a type of flight path and a type of termination of the type of flight path. A position fix may be or include a ground-based navigation aid (NAVAID), a waypoint or defined by reference to one or more radio NAVAIDs. The type of flight path describes how the aircraft maneuvers to a termination (e.g., a heading, a track, a course), and the type of termination describes an event or condition that causes the aircraft to switch to the next procedural leg (e.g., a fix, an altitude, an intercept). The ARINC 424 standard in particular defines twenty-three leg types by their path and terminator, coded in two-letter codes such as "CF" for "course to fix."

The AS planner 410 service is configured to determine a ground track and vertical guidance for the aircraft 204 from the sequence of procedural legs including the sequence of position fixes and the leg types, subject to rules and constraints of the clearances (e.g., IFR clearances) and the procedures (e.g., IFR procedures) such as those described above, as shown at block 506. The AS planner service may determine the ground track and vertical guidance in any of a number of different manners. The AS planner service may operate in a manner that is deeply vectorized in that the ground track and vertical guidance of the sequence of procedural legs may be evaluated across the procedural legs in parallel to improve performance. Self-consistency may govern a leg-wise halting criterion in an iterative process to ensure the path is mutually satisfactory under appropriate considerations.

In some examples, generation of the ground track may include the AS planner service 410 configured to generate a sequence of simple procedural legs from which the AS planner service is configured to determine the ground track, as shown at blocks 508 and 510. This sequence of simple procedural legs incudes the sequence of procedural legs in which a procedural leg with a leg type includes one or more turns is expanded into a sequence of procedural sub-legs with leg types excluding turns. Leg types that include one or more turns may include those with a type of flight path such as turn radius, arc, procedure turn, hold and the like. Procedural legs with these and other similar leg types may be expanded into sub-legs with leg types such as those with a type of flight path such as course, heading or the like. A sequence of the sub-legs may be equivalent to the procedural leg. Any fly-by position fixes may be converted to equivalent fly-over position fixes.

In some further examples, expanding the procedural leg includes the AS planner 410 service configured to access state data that describes a start position, speed and heading of the aircraft 204 at a position fix of the procedural leg with the leg type including the one or more turns. The AS planner service is then configured to expand the procedural leg into the sequence of procedural sub-legs including a respective sequence of position fixes determined from the start position, speed and heading. FIG. 6A illustrates an example procedural leg 600 for a teardrop-shaped holding fix (HF) leg type with one or more turns, and FIG. 6B illustrates an expansion of the example procedural leg into four sub-legs 602A, 602B, 602C and 602D.

In some examples, the AS planner 410 service is configured to identify start positions of the aircraft 204 at position fixes in the sequence of simple procedural legs, and one or more target altitudes, speeds and vertical speeds of the aircraft. The AS planner service is then configured to apply the start positions, and the one or more target altitudes, speeds and vertical speeds, to a kinematic model of the aircraft to determine the ground track.

The ground track may be expressed in a number of different manners. In some examples, the ground track may be expressed by geodesics on a reference ellipsoid that approximates the figure of the Earth. The ground track respects a speed dependent turn radius of the aircraft 204, geodetic altitude, and the like. Any procedural legs that terminate at an intersection may be converted to a fix using geometry; and any that terminate at an altitude may be converted to a fix using the kinematic model of the aircraft. FIG. 6C illustrates the ground track 604 for the example procedural leg shown in FIG. 6A; and FIG. 7 illustrates the ground track 700 for the sequence of procedural legs of a flight plan that includes the ground track shown in FIG. 6C.

For the vertical guidance, in some examples, the AS planner 410 service is configured to determine one or more notional altitudes, speeds and vertical speeds of the aircraft 204 over the ground track, as shown at block 512. In some of these examples, the AS planner service is configured to apply the one or more notional altitudes, speeds and vertical speeds to a kinematic model of the aircraft to determine one or more target altitudes, speeds and vertical speeds from which the vertical guidance is determined, as shown at block 514. The kinematic model may be or include an energetic physics model in two dimensions (lateral, altitude). The kinematic model may account for limitations of the aircraft such as its fuel efficiency, mass, flight dynamics and the like. The target altitudes, speeds and vertical speeds may be determined through a constrained quadratic optimization that may be expressed as an analytic function under constant durations of the procedural legs. In the optimization, the durations of the procedural legs may be self-consistently updated until convergent. The optimization may be multi-dimensional and simultaneous, and incorporate a penalty proportional to an amount of deviation of the target from the notional (including increasingly penalized deviations from altitude as the aircraft approaches touchdown).

In some further examples, the AS planner 410 service is configured to identify start positions, speed and heading of the aircraft 204 at position fixes in the sequence of procedural legs. In some of these examples, the AS planner service is configured to apply the start positions, speed and heading, and the one or more target altitudes, speeds and vertical speeds, to the kinematic model to determine the vertical guidance as reachable altitude and speed along the ground track, as shown at block 516.

In some examples, the AS planner 410 service is configured to iteratively determine the reachable altitude and speed of the aircraft 204. In this regard, the reachable altitude and speed may be initially disconnected, but converge toward continuity over a number of iterations in which the reachable altitude and speed are determined. FIG. 8 illustrates an example vertical guidance 800 for the ground track 700 shown in FIG. 7. As shown, the vertical guidance is expressed as a reachable altitude 802 and speed 804 along the ground track.

Regardless of the exact manner by which the ground track and the vertical guidance are determined, the AS planner 410 service is configured to generate a three-dimensional (3D) trajectory for the aircraft 204 that follows the planned route, from the ground track and the vertical guidance, as shown at block 518. The 3D trajectory may be expressed in a number of different manners, such as in some combination of the ground track and vertical guidance (e.g., ground track 700 and vertical guidance 800). The AS planner service is then configured to output the 3D trajectory for use in at least one of guidance, navigation or control of the aircraft. This may include the MMS 210 configured to send one or more maneuver commands to the VMS 208 to control the aircraft to follow the maneuver commands and thereby travel the 3D trajectory.

In some examples, the AS planner 410 service may be called to update the 3D trajectory of the aircraft 204 in which changes to the 3D trajectory are made in real-time or near real-time as a mission is executed. In this regard, the aircraft may receive instructions from the control station 202 or another facility such as an air traffic control (ATC) facility. These instructions may be responsive to traffic or other conditions such as weather conditions in the airspace, and the instructions may be issued to maintain rules and constraints such as those described above. The instructions may also be issued to create a no-fly zone for the aircraft. The instructions may be encoded in a manner similar to the flight plan. The instructions may be received as text, or verbally in which case the MMS 210 may convert to text through speech recognition.

FIGS. 9A, 9B, 9C and 9D are flowcharts illustrating various steps in a method 900 of supporting flight operations of an aircraft 204 in an airspace system, according to various example implementations of the present disclosure. The method includes accessing a flight plan encoded as text, that describes a proposed flight of the aircraft (through the airspace system), the flight plan indicating clearances that describe a planned route the aircraft is authorized by an air navigation service provider (ANSP) to travel through the airspace system, as shown at block 902 of FIG. 9A. The method includes applying the clearances to an airborne navigation database 412 to map the clearances to a sequence of procedural legs of procedures defined by the ANSP to be followed by the aircraft during the proposed flight, as shown at block 904. The sequence of procedural legs includes a sequence of position fixes, and indicating leg types each leg type of which is described by a type of flight path and a type of termination of the type of flight path.

The method 900 includes determining a ground track and vertical guidance for the aircraft 204 from the sequence of procedural legs including the sequence of position fixes and the leg types, subject to rules and constraints of the clearances and the procedures, as shown at block 906. The method includes generating a three-dimensional (3D) trajectory for the aircraft that follows the planned route, from the ground track and the vertical guidance, as shown at block 908. And the method includes outputting the 3D trajectory for use in at least one of guidance, navigation or control of the aircraft, as shown at block 910.

In some examples, determining the ground track at block 906 includes generating a sequence of simple procedural legs in which a procedural leg with a leg type including one or more turns is expanded into a sequence of procedural sub-legs with leg types excluding turns, as shown at block 912 of FIG. 9B. In some of these examples, the method includes determining the ground track from the sequence of simple procedural legs, as shown at block 914.

In some further examples, generating the sequence of simple procedural legs at block 912 includes accessing state data that describes a start position, speed and heading of the aircraft 204 at a position fix of the procedural leg with the leg type including the one or more turns, as shown at block 916. In some of these examples, the procedural leg is expanded into the sequence of procedural sub-legs including a respective sequence of position fixes determined from the start position, speed and heading, as shown at block 918.

In some examples, determining the ground track at block 906 includes identifying start positions of the aircraft 204 at position fixes in the sequence of simple procedural legs, one or more target altitudes, speeds and vertical speeds of the aircraft, as shown at block 920 of FIG. 9C. In some of these examples, the start positions, and the one or more target altitudes, speeds and vertical speeds, are applied to a kinematic model of the aircraft to determine the ground track, as shown at block 922. In some further examples, the ground track as determined is expressed as a path composed of the start positions interconnected by one or more of geodesics or arcs on a reference ellipsoid.

In some examples, determining the vertical guidance at block 906 includes determining one or more notional altitudes, speeds and vertical speeds of the aircraft 204 over the ground track, as shown at block 924 of FIG. 9D. In some of these examples, the method 900 includes applying the one or more notional altitudes, speeds and vertical speeds to a kinematic model of the aircraft to determine one or more target altitudes, speeds and vertical speeds from which the vertical guidance is determined, as shown at block 926. In some further examples, start positions, speed and heading of the aircraft at position fixes in the sequence of procedural legs are identified, as shown at block 928. The start positions, speed and heading, and the one or more target altitudes, speeds and vertical speeds, are then applied to the kinematic model to determine the vertical guidance as reachable altitude and speed along the ground track, as shown at block 930.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting flight operations of an aircraft in an airspace system, the apparatus comprising:
a memory configured to store computer-readable program code; and
processing circuitry configured to access the memory, and execute the computer-readable program code to cause the apparatus to at least:
access a flight plan that describes a proposed flight of the aircraft, the flight plan indicating clearances that describe a planned route the aircraft is authorized by an air navigation service provider (ANSP) to travel through the airspace system;
apply the clearances to an airborne navigation database to map the clearances to a sequence of procedural legs of procedures defined by the ANSP, the sequence of procedural legs including a sequence of position fixes, and indicating leg types each leg type of which is described by a type of flight path and a type of termination of the type of flight path;
determine a ground track and vertical guidance for the aircraft from the sequence of procedural legs including the sequence of position fixes and the leg types, subject to rules and constraints of the clearances and the procedures;
generate a three-dimensional (3D) trajectory for the aircraft that follows the planned route, from the ground track and the vertical guidance; and
output the 3D trajectory for use in at least one of guidance, navigation or control of the aircraft.

2. The apparatus of claim 1, wherein the apparatus caused to determine the ground track includes the apparatus caused to:
generate a sequence of simple procedural legs in which a procedural leg with a leg type including one or more turns is expanded into a sequence of procedural sub-legs with leg types excluding turns; and determine the ground track from the sequence of simple procedural legs.

3. The apparatus of claim 2, wherein the apparatus caused to generate the sequence of simple procedural legs includes the apparatus caused to:

access state data that describes a start position, speed and heading of the aircraft at a position fix of the procedural leg with the leg type including the one or more turns; and expand the procedural leg into the sequence of procedural sub-legs including a respective sequence of position fixes determined from the start position, speed and heading.

4. The apparatus of claim 2, wherein the apparatus caused to determine the ground track includes the apparatus caused to:

identify start positions of the aircraft at position fixes in the sequence of simple procedural legs, and one or more target altitudes, speeds and vertical speeds of the aircraft; and apply the start positions, and the one or more target altitudes, speeds and vertical speeds, to a kinematic model of the aircraft to determine the ground track.

5. The apparatus of claim 4, wherein the ground track as determined is expressed as a path composed of the start positions interconnected by one or more of geodesics or arcs on a reference ellipsoid.

6. The apparatus of claim 1, wherein the apparatus caused to determine the vertical guidance includes the apparatus caused to:

determine one or more notional altitudes, speeds and vertical speeds of the aircraft over the ground track; and apply the one or more notional altitudes, speeds and vertical speeds to a kinematic model of the aircraft to determine one or more target altitudes, speeds and vertical speeds from which the vertical guidance is determined.

7. The apparatus of claim 6, wherein the apparatus caused to determine the vertical guidance includes the apparatus further caused to:

identify start positions, speed and heading of the aircraft at position fixes in the sequence of procedural legs; and apply the start positions, speed and heading, and the one or more target altitudes, speeds and vertical speeds, to the kinematic model to determine the vertical guidance as reachable altitude and speed along the ground track.

8. A method of supporting flight operations of an aircraft in an airspace system, the method comprising:

accessing a flight plan that describes a proposed flight of the aircraft, the flight plan indicating clearances that describe a planned route the aircraft is authorized by an air navigation service provider (ANSP) to travel through the airspace system;

applying the clearances to an airborne navigation database to map the clearances to a sequence of procedural legs of procedures defined by the ANSP, the sequence of procedural legs including a sequence of position fixes, and indicating leg types each leg type of which is described by a type of flight path and a type of termination of the type of flight path;

determining a ground track and vertical guidance for the aircraft from the sequence of procedural legs including the sequence of position fixes and the leg types, subject to rules and constraints of the clearances and the procedures;

generating a three-dimensional (3D) trajectory for the aircraft that follows the planned route, from the ground track and the vertical guidance; and outputting the 3D trajectory for use in at least one of guidance, navigation or control of the aircraft.

9. The method of claim 8, wherein determining the ground track comprises:

generating a sequence of simple procedural legs in which a procedural leg with a leg type including one or more turns is expanded into a sequence of procedural sub-legs with leg types excluding turns; and determining the ground track from the sequence of simple procedural legs.

10. The method of claim 9, wherein generating the sequence of simple procedural legs comprises:

accessing state data that describes a start position, speed and heading of the aircraft at a position fix of the procedural leg with the leg type including the one or more turns; and expanding the procedural leg into the sequence of procedural sub-legs including a respective sequence of position fixes determined from the start position, speed and heading.

11. The method of claim 9, wherein determining the ground track comprises:

identifying start positions of the aircraft at position fixes in the sequence of simple procedural legs, and one or more target altitudes, speeds and vertical speeds of the aircraft; and applying the start positions, and the one or more target altitudes, speeds and vertical speeds, to a kinematic model of the aircraft to determine the ground track.

12. The method of claim 11, wherein the ground track as determined is expressed as a path composed of the start positions interconnected by one or more of geodesics or arcs on a reference ellipsoid.

13. The method of claim 8, wherein determining the vertical guidance comprises:

determining one or more notional altitudes, speeds and vertical speeds of the aircraft over the ground track; and applying the one or more notional altitudes, speeds and vertical speeds to a kinematic model of the aircraft to determine one or more target altitudes, speeds and vertical speeds from which the vertical guidance is determined.

14. The method of claim 13, wherein determining the vertical guidance further comprises:

identifying start positions, speed and heading of the aircraft at position fixes in the sequence of procedural legs; and applying the start positions, speed and heading, and the one or more target altitudes, speeds and vertical speeds, to the kinematic model to determine the vertical guidance as reachable altitude and speed along the ground track.

15. A computer-readable storage medium for supporting flight operations of an aircraft in an airspace system, the computer-readable storage medium being non-transitory and having computer-readable program code stored therein that, in response to execution by processing circuitry, causes an apparatus to at least:

access a flight plan that describes a proposed flight of the aircraft, the flight plan indicating clearances that describe a planned route the aircraft is authorized by an air navigation service provider (ANSP) to travel through the airspace system;

apply the clearances to an airborne navigation database to map the clearances to a sequence of procedural legs of procedures defined by the ANSP, the sequence of procedural legs including a sequence of position fixes, and indicating leg types each leg type of which is described by a type of flight path and a type of termination of the type of flight path;

determine a ground track and vertical guidance for the aircraft from the sequence of procedural legs including the sequence of position fixes and the leg types, subject to rules and constraints of the clearances and the procedures;

generate a three-dimensional (3D) trajectory for the aircraft that follows the planned route, from the ground track and the vertical guidance; and output the 3D trajectory for use in at least one of guidance, navigation or control of the aircraft.

16. The computer-readable storage medium of claim 15, wherein the apparatus caused to determine the ground track includes the apparatus caused to:

generate a sequence of simple procedural legs in which a procedural leg with a leg type including one or more turns is expanded into a sequence of procedural sub-legs with leg types excluding turns; and determine the ground track from the sequence of simple procedural legs.

17. The computer-readable storage medium of claim 16, wherein the apparatus caused to generate the sequence of simple procedural legs includes the apparatus caused to:

access state data that describes a start position, speed and heading of the aircraft at a position fix of the procedural leg with the leg type including the one or more turns; and expand the procedural leg into the sequence of procedural sub-legs including a respective sequence of position fixes determined from the start position, speed and heading.

18. The computer-readable storage medium of claim 16, wherein the apparatus caused to determine the ground track includes the apparatus caused to:

identify start positions of the aircraft at position fixes in the sequence of simple procedural legs, and one or more target altitudes, speeds and vertical speeds of the aircraft; and apply the start positions, and the one or more target altitudes, speeds and vertical speeds, to a kinematic model of the aircraft to determine the ground track.

19. The computer-readable storage medium of claim 18, wherein the ground track as determined is expressed as a path composed of the start positions interconnected by one or more of geodesics or arcs on a reference ellipsoid.

20. The computer-readable storage medium of claim 15, wherein the apparatus caused to determine the vertical guidance includes the apparatus caused to:

determine one or more notional altitudes, speeds and vertical speeds of the aircraft over the ground track; and apply the one or more notional altitudes, speeds and vertical speeds to a kinematic model of the aircraft to determine one or more target altitudes, speeds and vertical speeds from which the vertical guidance is determined.

21. The computer-readable storage medium of claim 20, wherein the apparatus caused to determine the vertical guidance includes the apparatus further caused to:

identify start positions, speed and heading of the aircraft at position fixes in the sequence of procedural legs; and apply the start positions, speed and heading, and the one or more target altitudes, speeds and vertical speeds, to the kinematic model to determine the vertical guidance as reachable altitude and speed along the ground track.

* * * * *

UNITED STATES PATENT AND TRADEMARK OFFICE
CERTIFICATE OF CORRECTION

PATENT NO. : 12,014,638 B2
APPLICATION NO. : 17/686052
DATED : June 18, 2024
INVENTOR(S) : Andrew Geng and Margaret Reagan It is certified that error appears in the above-identified patent and that said Letters Patent is hereby corrected as shown below:

On the Title Page

Item (71), The Applicant: "Aurora Flight Sciences Corporation" should read --Aurora Flight Sciences Corporation, a subsidiary of The Boeing Company--

Signed and Sealed this
Tenth Day of December, 2024

Katherine Kelly Vidal
*Director of the United States Patent and Trademark Office*